July 29, 1952 W. R. PURCELL 2,604,779
METHOD AND APPARATUS FOR MEASURING CAPILLARY PRESSURE
Filed May 11, 1948 2 SHEETS—SHEET 1

INVENTOR: WILLIAM R. PURCELL
BY HIS ATTORNEY:

INVENTOR: WILLIAM R. PURCELL
BY HIS ATTORNEY:

Patented July 29, 1952

2,604,779

UNITED STATES PATENT OFFICE 2,604,779

METHOD AND APPARATUS FOR MEASURING CAPILLARY PRESSURE

William R. Purcell, Houston, Tex., assignor to Shell Development Company, San Francisco, Calif., a corporation of Delaware Application May 11, 1948, Serial No. 26,308

6 Claims. (Cl. 73—38)

This invention relates to a method and apparatus for determining pore characteristics of a porous solid body and pertains more particularly to the determination of capillary pressure curves of rock samples, especially rock samples or cuttings obtained during well drilling operations.

The determination of capillary pressure curves has become increasingly important in core analysis work, especially in estimating the percentages of connate water at various heights above the water table. The nature of capillary pressures and the role they play in reservoir behavior is well known to those versed in the art. Briefly, capillary pressure in reservoir rock may be defined as the difference in pressure across the interface between two contacting fluid phases present in said rock, such, for example, as oil and water. Capillary pressure is a function of the dimensions of the pore within which the fluid phases are contained and is counterbalanced in a reservoir by a hydrostatic force arising from the difference in density of the fluid phases. The determination of capillary pressures assumes especial importance in connection with studies of the permeability of rock formations.

The several techniques that have so far been employed in determining capillary pressure curves fall into two general categories. In the first method, liquid may be removed from, or imbibed by, a rock sample through the medium of a high displacement pressure porous diaphragm. In the second method, it may be removed by subjecting the rock sample to increased gravitational forces in a centrifuge.

It has been found that the methods so far employed for determining capillary pressure curves have serious limitations. The maximum pressure which can be observed in the first method is limited by the particular technique employed as well as by the properties of the diaphragm. The maximum displacement pressure procurable in a porous diaphragm limits the experiments to about 30 to 60 p. s. i. The greatest drawback of this method is that the time required, in any one test, to reach saturation equilibrium at a given pressure may be as much as from 5 to 7 days. Hence, the time required to obtain a curve of but 5 or 6 points may be measured in terms of weeks. An additional difficulty encountered is that of maintaining a constant pressure for the long period of time required to reach equilibrium.

The limitations of the centrifuge method for determining capillary pressures are chiefly those of mechanical difficulties. The centrifuge must be equipped with a highly accurate speed regulator for the tolerance of speed fluctuation is low. In addition, the interpolation from centrifuge speed to capillary pressures is somewhat tedious.

To date, no suitable method for taking capillary pressure measurements on rock cuttings has been developed. In using any of the present methods it is first necessary to procure a sample of the rock formation, the sample having appreciable dimensions. To accomplish this end, the expensive operation of coring has been resorted to. In the course of drilling, cuttings are always available and while these are too small to be suitable for some tests, such as air permeability measurements, they provide, according to the present invention, satisfactory samples with which to determine other important characteristics of the rock formation from which they are cut.

It is, therefore, a primary object of the present invention to provide a method and apparatus for rapidly obtaining accurate data from porous bodies, from which data capillary pressure curves may be plotted.

A further object of this invention is to provide a method and apparatus for determining capillary pressure and effective pore volume of small portions of porous solids, such as, for example, drill cuttings of earth formations.

Another object of this invention is to provide a method and apparatus for determining the permeability of a porous formation from measurements made on either large or regular portions, or small irregular portions, of said formation.

A still further object of the present invention is to provide an apparatus for evacuating gases from a porous body and subsequently making capillary pressure determinations at pressures below and above atmospheric pressure to obtain data for capillary pressure curves.

These and other objects of this invention will be understood from the following description of the method and of a preferred embodiment of the apparatus of the present invention as shown in the accompanying drawing wherein.

Figure 1:
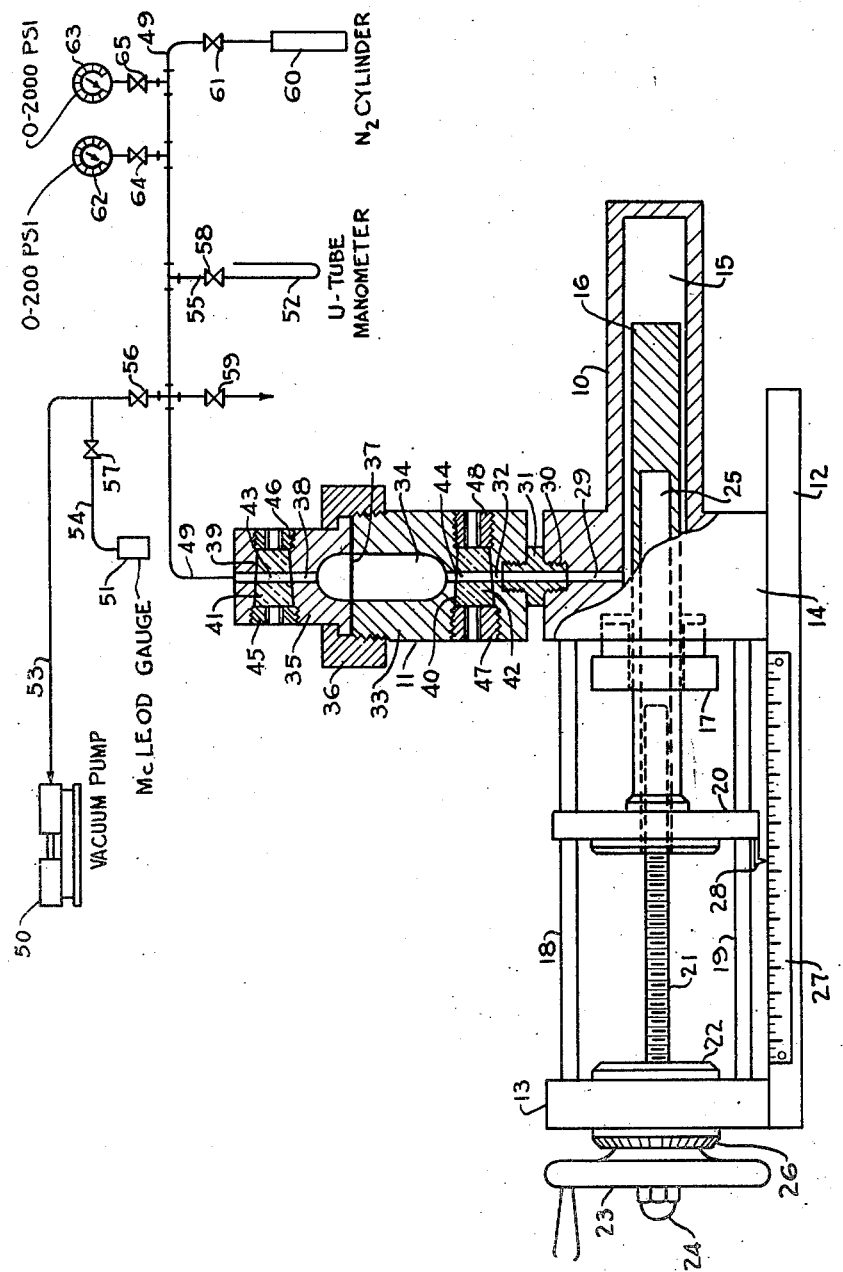
Figure 1 is a side view, partly in cross section, of a capillary pressure apparatus and a schematic arrangement of auxiliary apparatus attached thereto.

In the study of capillary pressures, two general types of liquid-solid systems may be considered, namely, one in which the liquid wets the solid (i. e., when the contact angle of the liquid against the solid is less than 90 degrees), the other in which the liquid does not wet the solid (i. e., when the contact angle of the liquid against the solid is greater than 90 degrees). In the case of "wetting" liquids, the action of the surface forces is such that the liquid spontaneously fills the voids within the solid. These same forces likewise oppose the withdrawal of the liquid from the pores of the solid. In the case of "non-wetting" liquids, the action of the surface forces involved opposes the entrance of the liquid into the pores of the solid so that pressure must be applied to the liquid to cause it to penetrate the pores of the solid. Previously, capillary pressure curves have been determined for solids through the use of "wetting" liquids. The present invention, however, deals solely with the use of a "non-wetting" liquid such, for example, as mercury for making capillary pressure determinations.

It has been found that a system using a "non-wetting" liquid offers advantages which are not inherent in either the centrifuge or porous diaphragm method. In using the "non-wetting" liquid system of the present invention the saturation equilibrium of a sample is reached within a few seconds, and an entire capillary pressure curve, having as many as 30 to 40 points, can be obtained in about an hour. Data may be obtained when using samples of porous bodies that are large or small, regular or irregular. Furthermore, the apparatus used in making the capillary determinations is relatively simple, free of mechanical deficiencies, easy to operate and adapted to make tests at pressures which are well below and well above normal atmospheric pressure.

Briefly, the method of making capillary pressure determinations according to the present invention comprises the steps of putting a sample of porous material in a fluidtight cell, evacuating gases from said cell and said porous material, surrounding said evacuated porous material with a non-wetting fluid, building up the pressure on said fluid by small increments to force it into the pores of said material, and measuring the amount of liquid forced in the porous material at each pressure.

An apparatus somewhat similar to that of the present invention is described in Letters Patent No. 2,327,642 to Horner. The Horner device, however, cannot carry out the present method, being adapted only for operations at pressures above that of the atmosphere and with the pores of the solid filled with gas, in which case it is impossible to measure true capillary pressure curves. The Horner device furthermore lacks the accuracy required for the purposes of the present invention, since Horner's pressure is measured by means of a gauge directly connected to the liquid phase, thereby decreasing the accuracy of the liquid phase volume measurements.

Referring to Figure 1, one embodiment of the apparatus used in obtaining capillary pressure data comprises a volumetric mercury pump designated by the numeral 10 and a sample holder 11 diagrammatically shown to be connected to a system for evacuating said sample holder 11 or for maintaining a fixed pressure thereon. Preferably, the apparatus is so arranged that the amount of mercury required is kept as small as possible in order to minimize volume changes which result from temperature fluctuations, thereby eliminating the necessity for thermostatting the equipment. The mercury pump 10 comprises a base plate 12 having fixedly mounted thereon a bearing plate 13 and a piston housing 14. A chamber 15, open at one end, is formed in said housing 14. A piston 16 is mounted for reciprocating movement within said chamber 15 through a bearing and stuffing box 17 which closes the open end of said chamber in a pressure-tight manner. Extending between bearing plate 13 and housing 14 are a plurality of rods 18 and 19 which serve as guides for a piston guide plate 20 mounted for sliding movement along said rods.

The guide plate 20 is drilled and tapped to receive an accurately machined screw 21 which is mounted between said plate 20 and a bearing 22 affixed to said bearing plate 13. The screw 21 may be operated in either direction by a hand wheel 23 secured to the end thereof by a nut 24. The piston guide plate 20 is secured to the end of the piston 16 outside said stuffing box 17, said piston end having a coaxial chamber 25 drilled therein to accommodate the screw means 21.

Preferably, the screw 21 is machined to have a pitch such that one turn of the screw 21 moves the piston 16 through a distance sufficient to displace one cubic centimeter of fluid from the piston chamber 15. Also, the hub of the hand wheel 23 is graduated in fractions of cubic centimeters (as the scale at 26) to give a more accurate measurement of the fluid displaced. If desired, a cubic centimeter scale 27 may be attached to the base plate 12, and a pointer 28 to the sliding plate 20. Thus, the amount of fluid displaced from said pump 10 at any setting of the piston 16 may be quickly read from the setting of the pointer 28 on the scale 27 and the setting of the scale 26 on the hub of the hand wheel 23.

A conduit 29, in communication between the piston chamber 15 and the space outside the housing 14, may be threaded as at 30 to allow a suitable conduit 31 to communicate between the chamber 15 of the pump 10 and a conduit or drain port 32 in the sample holder 11. In this embodiment the conduit 31, in communication between the pump 10 and the sample holder 11, is a nipple which rigidly connects said sample holder above said pump. If desired, means such as removable bolts (not shown) may be used to connect the sample holder 11 and the mercury pump housing 14 so that any mechanical strain which may be set up on the holder (as by removing coupling 36) will not affect their positions relative to that of the conduit 31. This type of connection is especially advantageous as it permits sample chambers of any desired size to be interchangeably connected to the mercury pump 10.

The sample holder 11 consists of a body 33 having a sample chamber 34 therein. The holder 11 is equipped with suitable port means for introducing a porous sample into the sample chamber 34. This normally closed port means may consist of a removable plate on the top or on any side of the sample holder 11. In this embodiment it consists of a removable cover 35 that is secured to the body 33 in a fluidtight manner by any suitable means, as by a coupling 36. A gasket 37 of suitable material is normally placed between the body 33 and the cover 35. If the sample holder 11 is closed and sealed by a coupling 36 and gasket 37, identical gaskets should be used on any series of samples and a reference mark (not shown)

should be provided on the outside of said coupling and said holder so that the cover 35 is pulled down on said gasket, or different gaskets, the same amount each time. This is necessary in order to maintain the sample chamber 34 at a constant capacity. This is especially important in obtaining the capacity of the empty sample chamber and of the bulk volume of the porous solid under test.

A second conduit 38 is in communication between said sample chamber and the space outside said body 33. Preferably, this second conduit 38 is in communication with the top of the sample chamber and both the conduits 32 and 38 are vertically positioned in said body 33 and said cover, respectively. Also, it is preferred that the bottom of the sample chamber 34 be concave to facilitate the drainage of mercury or another liquid from said chamber 34 back into the pump 10. However, since the sample chamber is evacuated by pumping during a test it is immaterial as to what shape the top of said chamber 34 may be, i. e., the top of said chamber may be flat, concave, convex, or any other shape.

Sight holes 39 and 40 are drilled through the cover 35 and body 33, respectively, so that they intercept or communicate with the fluid conduits 38 and 32, respectively. Transparent pressure resistant plugs 41 and 42, having diametral conduits 43 and 44 therethrough, are positioned in the central portion of the holes 39 and 40, being fixedly secured therein by bushings 45, 46, 47 and 48 so that the diametral conduits 43 and 44 are in coaxial alignment with the conduits 38 and 32, respectively. The plugs 41 and 42 may be made of glass or any transparent plastic material possessing the necessary physical characteristics for use in pressure equipment, said material being unaffected by a chemical action of the pressure fluid. Thus the transparent plugs 41 and 42 form means for locating the level of a fluid, for example, a mercury column, in the fluid conduits 38 and 32 and for observing the movement of the column. In order to insure a proper positioning, tight fit and ready removal of the plugs 41 and 42 in the holes 39 and 40, the plugs are tapered to a frusto-conical shape as shown in Figure 1. Horizontal lines (not shown) may be drawn, cut or etched on one end of the plugs to serve as a reference point in observing a mercury column in the conduits 43 and 44 of said plugs 41 and 42. If desired, an additional horizontal line may be added on the opposite face of each plug 41 and 42 in order to obviate personal errors in observation due to parallax. An alternative method of incorporating reference marks is to make the upper halves of conduits 43 and 44 of slightly larger diameter than the lower halves. The lines of demarcation between the holes of different sizes in the plugs 41 and 42 then serve as reference marks.

Figure 2:
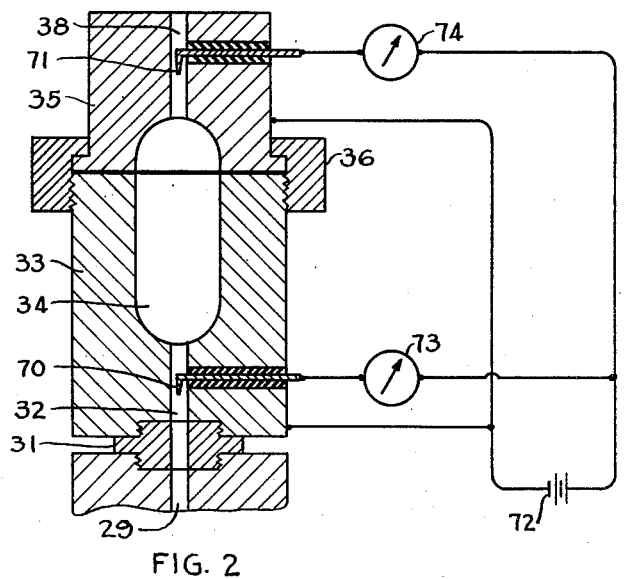
Figure 2 is a cross-sectional view of another embodiment of the present invention having electrical contacts as means for locating the mercury level within the apparatus.

It will also be seen that means other than transparent windows may be used to locate the mercury-gas interface in the fluid conduits 38 and 32. In the embodiment shown in Figure 2, the mercury level locating means comprises a pair of electrical contacts 70 and 71 secured to the body 33 and cover 35 of the sample holder in an insulated manner and extending into the fluid conduits 32 and 38, respectively. The contact 70 and 71 are electrically connected to a suitable power source, such as a battery 72, and to means for indicating a current flow, such as a pair of ammeters 73 and 74. The meters 73 and 74 indicate the mercury-gas interface as the rising mercury column contacts first one contact 70 and then the other 71.

The conduit 38 leading from the sample chamber 34 is connected to any suitable equipment for selectively putting the sample chamber 34 under any desired pressure ranging from high vacuum (i. e., very low absolute pressure) to high pressure. A system of this type is schematically shown in Figure 1 wherein a common conduit 49 is in communication between the conduit 38 in the sample holder 11 and both the vacuum and pressure sections of the system. The vacuum section comprises a vacuum pump 50, McLeod gauge 51 and U-tube manometer 52 in communication with conduit 49 through conduits 53, 54 and 55, controlled by valves 56, 57 and 58, respectively. The vacuum pump 50 may be of any suitable type adapted to draw a high vacuum on the system, preferably in the range of 0.001 mm. mercury. The system may be vented to the atmosphere through a valve 59. The pressure section of said system comprises a storage cylinder 60 for a gas under high pressure (preferably nitrogen at 2000 p. s. i.) connected to said conduit 49 through a regulator or throttling valve 61.

One or more pressure gauges may be tapped into the conduit 49 to indicate the pressure therein. As illustrated in Figure 1 two gauges 62 and 63 of different ranges may be used, said gauges having valves 64 and 65 by which they may be isolated from the conduit 49.

In making capillary pressure determinations on samples of rock formation, a single sample may consist of one or more plugs cut from a core or material consisting of drill cuttings selected from drilling operations. The adaptability of the present system to capillary pressure determinations in drill cuttings forms the essentially important feature thereof. Preliminary to running a test on a sample, any liquid present in the original rock material is extracted and the sample is then dried.

At the start of the test, the piston 16 of the mercury pump is retracted from the piston chamber 15 until the pointer 28 is aligned with, or near, the zero position on the scale 27. The rock sample is then placed in the sample chamber 34 and the cover 35 is placed on the body 33 of the sample holder 11 and fastened thereto in pressure tight manner by coupling 36. With valves 59, 61, 64, and 65 closed and valves 58, 56 and 57 open, a vacuum is drawn on the system. When the McLeod gauge 51 indicates that the pressure of the system has reached a value of from 0.01 to 0.001 mm. of mercury or lower, valves 56 and 57 are closed and the vacuum pump 50 is shut off. At this low pressure essentially all the gases that normally fill the pores or capillaries of the rock sample have been removed.

The hand wheel 23 of the mercury pump 10 is turned so that the screw 21 forces the piston 16 into the piston chamber 15 causing the mercury therein to be displaced and forced through conduit 29 and nipple 31 into conduits 32 and 44 of the sample holder 11 and the transparent plug 42, respectively. When the height of the mercury column in said conduit 44 reaches the middle, or the reference line, of said plug 42, movement of the hand wheel is stopped and a reading of the pump setting is taken by noting the setting of the pointer 28 on scale 27 and the setting of the hand wheel scale 26.

Continued movement of the hand wheel 23 causes the piston 16 to force mercury out of the pump 10 into the sample holder 11. The mercury enters the bottom of the sample chamber 34, surrounds the rock sample therein (not shown), fills said chamber 34 and leaves the top of said chamber through conduits 38 and 43 in the cover 35 and upper plug 41. When the meniscus of the rising mercury column in the conduit 43 has reached the reference mark on said plug 41, movement of the hand wheel 23 is stopped and a second reading of the pump setting is taken in the above-described manner. When the readings are taken on scales 26 and 27 which are calibrated in cubic centimeters of liquid displaced from the pump, the difference between the first and second settings of the pump is equal to the volume of mercury actually in the sample chamber 34. When this figure is subtracted from the known volume of the sample chamber 34, an accurate measurement of the bulk volume of the rock sample is obtained since the non-wetting liquid does not enter the pores of the sample at the initial low absolute pressure. The volume of mercury contained in the empty sample chamber 34 is previously determined by making a blank run and obtaining the difference in the pump settings when the meniscus is positioned in the upper and lower sight plugs 41 and 42, respectively.

The valve 59 to the atmosphere is now cracked to allow air to enter the system through conduits 55 and 49 until the mercury column in the conduit 43 of the sight plug 41 has receded about one-half a centimeter below its reference mark at which time the valve 59 is closed. The meniscus of the mercury column is brought up to the reference mark of plug 41 again by advancing the pump piston 16 into its chamber 15. At this point readings are taken on the scales 26 and 27 of the pump and on the U-tube manometer and the operation is repeated.

This procedure of alternately building up the pressure to cause recession of the mercury meniscus and advancing the pump piston to return the meniscus to the reference mark is repeated. When atmospheric pressure is reached, valves 58 and 59 are closed. Pressure on the system is then increased by the introduction of nitrogen from the high pressure cylinder 60 through the reducing regulator 61. Valves 64 and 65 are opened to permit gauges 62 and 63 to indicate the pressure in the system. A number of pump readings may now be taken at increasing pressure increments up to the pressure of the gas in cylinder 60 which is usually about 2000 p. s. i. It is recognized that the apparatus could readily be modified to attain even higher pressures but from experience it has been found that all rock samples of interest become completely filled with mercury at pressures well below 2000 p. s. i.

The volume readings at various pressures are corrected in a suitable manner for the relatively small change in volume of the sample holder 11, the mercury pump 10, and the mercury contained therein which occurs when pressure is applied to the system. These corrections are usually obtained by making volume and pressure readings in the manner described above but without a sample in the holder 11.

To the pressures as read from manometer 52 and gauges 62 and 63 is added the hydrostatic pressure due to the weight of the column of mercury between the reference mark in window 41 and the sample in chamber 34.

Figure 3:
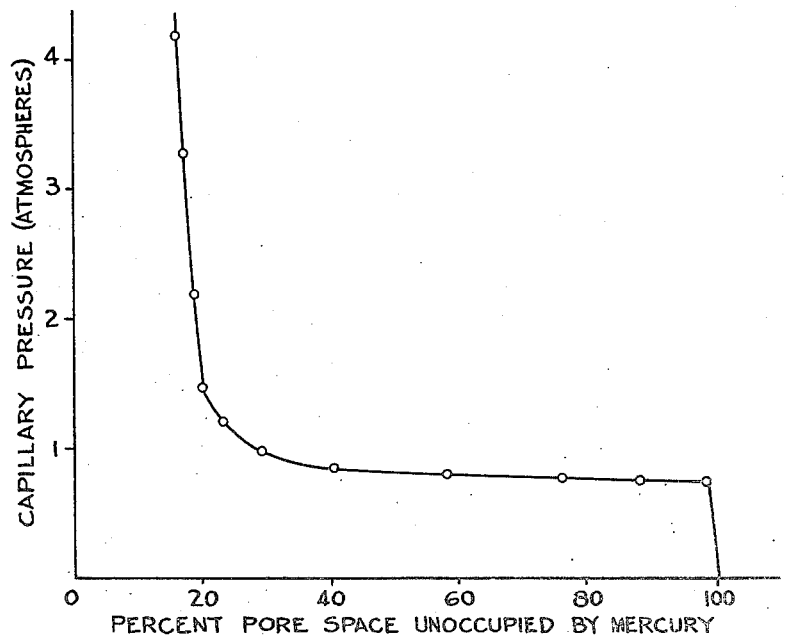
Figure 3 is a typical mercury capillary pressure curve.

The corrected pressure and volume readings indicate the amount of mercury injected into the porous solid under various pressure increments and supply the necessary data for plotting mercury capillary pressure curves as shown in Figure 3. This is a typical curve showing the manner in which the pores of an evacuated rock sample are filled with mercury as pressure is applied to force the mercury into the pores. Having obtained a mercury capillary pressure curve, the permeability of a rock sample may be obtained therefrom because of the fundamental relationship that exists between permeability and capillary pressure, the latter characteristic having been obtained by the above-described procedure. Likewise other important properties of porous media such as relative permeability, surface area, and pore size distribution may be obtained from mercury capillary pressure curves.

The determination of capillary pressure curves through the injection of mercury (a non-wetting liquid) is particularly important in this type of work because of the rapidity with which points on the curve may be obtained. This enables one to obtain quickly sufficient information to determine the curve exactly, and this is particularly advantageous in the low pressure range where capillary pressure curves determined with wetting liquids are difficult to define. During the course of the determination of the mercury capillary pressure curve, it is possible to measure also the bulk volume, effective pore space, and hence per cent porosity of the sample. Furthermore, particles the size of drill cuttings may be handled with the same ease and facility as larger samples.

I claim as my invention:

1. An apparatus for determining the capillary pressure of porous bodies, a chamber with relatively thick pressure-resistant walls adapted to receive the bodies, means comprising a first fluid passageway extending through the walls of the chamber for supplying thereto a liquid, means comprising a second fluid passageway through the walls of said chamber for applying thereto a gaseous pressure, first and second liquid level indicating means in said first and second fluid passageways, means for indicating the volume of the liquid supplied to said chamber, means for selectively varying the pressure of the gaseous phase applied to said chamber from a high vacuum to a high superatmospheric value, means for indicating said pressure and conduit means in communication between said chamber and said pressure indicating means.

2. An apparatus for determining the capillary pressure of porous bodies, a chamber with relatively thick pressure-resistant walls adapted to receive the bodies, means comprising a first fluid passageway extending through the walls of the chamber for supplying thereto a liquid, means comprising a second fluid passageway through the walls of said chamber for applying thereto a gaseous pressure, first and second transparent pressure-resistant window means in the chamber walls for observing liquid levels in said first and second fluid passageways, means for indicating the volume of the liquid supplied to said chamber, means for selectively varying the pressure of the gaseous phase applied to said chamber from a high vacuum to a high superatmospheric value, means for indicating said pressure and conduit means in communication between said chamber and said pressure indicating means.

3. An apparatus for determining the capillary pressure of porous bodies, a chamber with relatively thick pressure-resistant walls adapted to receive the bodies, means comprising a first fluid passageway extending through the walls of the chamber for supplying thereto a liquid, means comprising a second fluid passageway through the walls of said chamber for applying thereto a gaseous pressure, first and second electrical contact means for indicating liquid levels in said first and second fluid passageways, means for indicating the volume of the liquid supplied to said chamber, means for selectively varying the pressure of the gaseous phase applied to said chamber from a low subatmospheric to a high superatmospheric value, means for indicating said pressure and conduit means in communication between said chamber and said pressure indicating means.

4. A method for determining the capillary pressure of porous bodies, comprising the steps of confining a porous body in a closed zone, evacuating said zone and the pore space of the body confined therein to a high vacuum, admitting a liquid to said zone to a reference level above said body, thereby completely immersing said body in said liquid, said body being non-wettable by said liquid, applying in step-wise increments a gaseous pressure against the surface of said liquid to depress said surface from said reference level, admitting in step-wise increments further amounts of the liquid to said zone to maintain said liquid at the reference level, thereby causing a penetration of the pore space of said body by step-wise increments of said non-wetting liquid, and noting the corresponding increases of gaseous pressure and of liquid volume admitted to said zone necessary for maintaining said liquid at said reference level.

5. In an apparatus for determining the capillary pressure of porous bodies, a housing with pressure-resistant walls having a chamber therein adapted to receive the porous bodies, first fluid passageway means extending through the walls of the housing, pump means in communication with said first conduit means for supplying a fluid under pressure to said chamber, second fluid passageway means through the walls of said housing, a source of gaseous pressure, a source of vacuum, valve means in said second fluid passageway means for selectively connecting thereto either of said sources, means for indicating the volume of fluid supplied to said chamber, means for indicating the pressure therein, and first and second transparent pressure-tight window means for observing liquid levels in said first and second fluid passageways, said window means in said second fluid passageway means being positioned at a level at least as high as the top of the chamber.

6. An apparatus for determining the capillary pressure of porous bodies, a chamber with relatively thick pressure-resistant walls adapted to receive the bodies, means comprising a first fluid passageway extending through the walls of the chamber for supplying thereto a liquid, means comprising a second fluid passageway through the walls of said chamber for applying thereto a gaseous pressure, first and second liquid level indicating means in said first and second fluid passageways, means for indicating the volume of the liquid supplied to said chamber, means for selectively varying the pressure of the gaseous phase applied to said chamber from a low subatmospheric to a high superatmospheric value, and plural gauge means for indicating the pressure within said subatmospheric and said superatmospheric pressure ranges.

WILLIAM R. PURCELL.

REFERENCES CITED

The following references are of record in the file of this patent:

UNITED STATES PATENTS

| Number | Name | Date |
|---|---|---|
| 1,932,767 | Brown | Oct. 31, 1933 |
| 2,293,488 | Bays | Aug. 18, 1942 |
| 2,323,556 | Mattocks | July 6, 1943 |
| 2,327,642 | Horner | Aug. 24, 1943 |
| 2,390,252 | Hayward | Dec. 4, 1945 |
| 2,465,948 | Welge | Mar. 29, 1949 |